May 16, 1950  O. RASMUSSEN  2,507,933

COMPASS CHECKING DEVICE

Filed Feb. 26, 1949

INVENTOR
OLAF RASMUSSEN

BY HIS  Walter W. Riedel
ATTORNEY.

Patented May 16, 1950

2,507,933

UNITED STATES PATENT OFFICE 2,507,933

COMPASS CHECKING DEVICE

Olaf Rasmussen, Port Clinton, Ohio

Application February 26, 1949, Serial No. 78,531

6 Claims. (Cl. 73—1)

This invention relates to an improved device for checking the accuracy of compasses.

It is among the objects of the present invention to provide a simple and reliable device for checking compasses particularly of the type used by marines.

A further object of the present invention is to provide a compass checking device adapted not only to use sunlight as a means for providing checking indications but also adapted to use a prevailing wind for the same purpose in case the sunlight is not available.

Further objects and advantages of the present invention will be apparent from the following description, reference being had to the accompanying drawings, wherein a preferred embodiment of the present invention is clearly shown.

Figure 1:
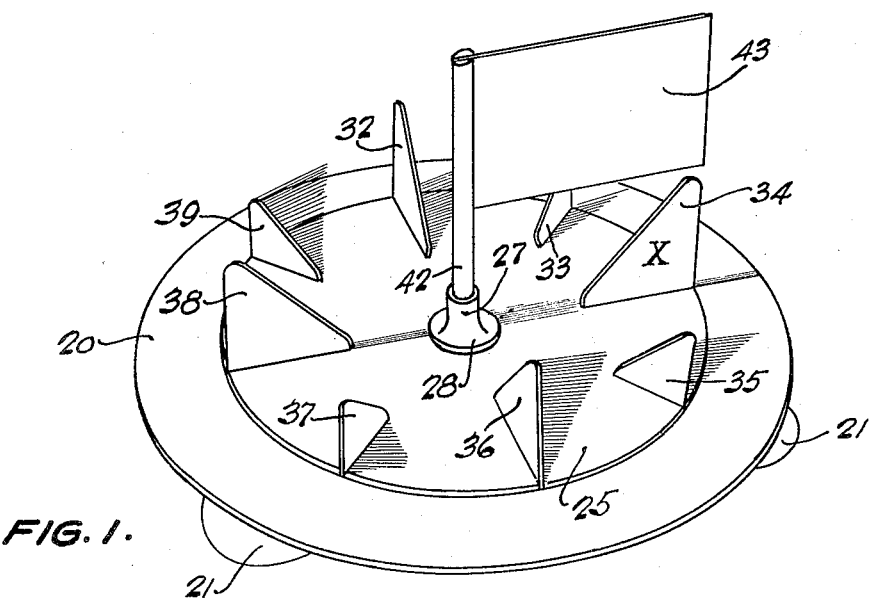
Fig. 1 is a perspective view of the improved compass checking device.
Figure 3:
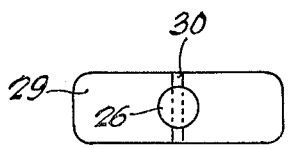
Fig. 3 is a detail view of the friction providing elements of the device.
Figure 2:
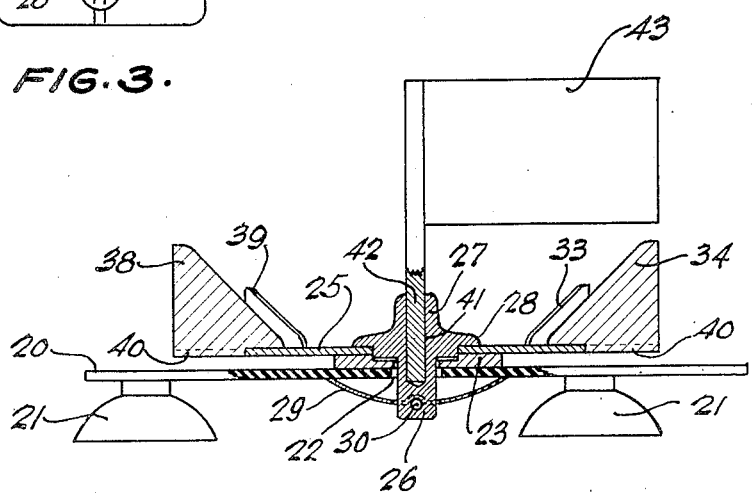
Fig. 2 is a fragmentary sectional view of the device.

The present invention provides a reliable, accurate and simple compass checking device which may be produced commercially at a minimum cost of time and material, therefore making available low cost equipment for operators of small pleasure cruisers. By having the device of the present invention available, the small boat owner may check his compass from time to time and particularly when an extended cruise is anticipated even though his compass has previously been compensated by a competent person. Because of shifting of metallic objects on board the boat or for various other reasons, a previously compensated compass may be rendered inaccurate and by testing it with the device of the present invention such inaccuracies may readily be discovered and corrections made.

Referring to the drawings, the numeral 20 designates the base plate, which is provided with spaced suction cups 21 by means of which the device may securely be attached to any suitable stationary member on the boat, preferably in close proximity to the compass. Base 20 is preferably round and has a central opening 22. A centrally apertured spacing collar 23 is centrally secured to the base plate on the side opposite the suction cups.

A dial 25 having a central aperture is rotatably supported upon the spacer collar 23, pin 26, extending through the central apertures of the dial 25, collar 23 and base 20, holding these members coaxial. Pin 26 has an enlarged head portion 27 providing an annular flange 28 which engages and rests upon the upper, outer surface of the dial. An arched blade spring 29 is centrally apertured to fit over the pin 26 so that the ends of the spring engage the bottom surface of the base 20. Spring 29 is biased toward the base and a pin 30, extending transversely through pin 26, provides an abutment for the biased spring 29 so that it constantly exerts a pull upon the pin 26 whereby the flange 28 of its head frictionally engages the dial and constantly but yieldably resists its rotation relatively to the base.

Dial 25 is disc-shaped and has a plurality of radially arranged vanes extending at right angles from the side thereof opposite the base. These vanes are equally spaced one from the other. Fig. 1 shows the dial 20 as having eight, comparatively thin, triangularly shaped vanes or fins 32, 33, 34, 35, 36, 37, 38 and 39 respectively. Each fin extends radially from the outer edge of the dial, stands at right angles to the outer face of the dial and is at 45° angular relation to the next adjacent vane. Alternate fins or those numbered by the even numbers in Fig. 1 are larger than the intermediate fins or those numbered by the uneven numbers. They may be attached to the dial in any suitable manner, the present drawings showing each having a tang 40 which fits into a radial slot in the dial. The tang may be welded or peened over to fasten the fin securely to the dial.

The head 27 of pin 26 has an axial recess 41 into which a post 42 rotatably fits. Post 42 has a weathervane 43 radially extending therefrom so that relative rotation between the post 42 and dial 25 brings the weathervane into vertical alignment with the respective fins 32 to 39 on said dial.

The device of the present invention is used in the following manner; to check the compass, the navigator of the boat stops his boat in comparatively open waters and heads it in a selected direction, as for example, "north" as indicated by the boat's compass. The compass checking device having been secured to a suitable stationary part of the boat fully exposed to sunlight is then initially adjusted by turning the dial 25 relatively to the anchored base 20 until the specially marked fin, the one numbered 34 in Fig. 1 and marked "X," casts a sharp, narrow shadow on the base 20 which is preferably finished in a light color more clearly to show the shadow. All other fins, excepting the one diametrically opposite the one marked "X," cast triangularly shaped shadows as shown in Fig. 1. The checking device is now set and remains untouched for the remaining portion of the test.

After so setting the checking device, the boat is slowly turned, on its vertical axis, completely around until the compass again indicates "north." As the shadow cast upon the base 20 by each successive fin becomes distinctly narrow and sharp, the navigator checks the degrees indicated on the compass rose. If, as each fin shadow becomes narrow and sharp, the compass rose does not indicate a 45° shift, then the navigator knows the compass is not functioning precisely. The amount of deviation by the compass may readily be discerned as each fin casts its narrowest and sharpest shadow which, if the compass is functioning precisely, will indicate 45° intervals on its rose or dial, however, if the compass is faulty, the difference plus or minus may immediately be ascertained. The compass may then properly be adjusted or compensation for the known deviation be made during a cruise.

Bright sunlight may not always be available when it is found necessary or desirable to test the compass and therefore the aforedescribed process for testing would not be possible. However, the device of the present invention is not limited solely to the use of sunlight for testing purposes. On the contrary, if sunlight is not available, wind may be used for the same purpose.

Generally a steady or prevailing breeze or wind is found about substantially open waters. Due to the simplicity of the device checking should require no more than ten minutes and usually a steady and prevailing breeze or wind with a velocity of at least 1 to 2 miles per hour is available.

For testing by wind, the post 42 with its weather-vane 43 is attached to the checking device by inserting the post into the recess 41. As before, the boat is headed directly north according to the compass. The wind striking the vane 43, will move it into a definite position and maintain it there. Now the dial is rotated until the vane 43 is in vertical alignment with the fin 34, marked "X" as shown in Fig. 1. Following this the boat is slowly turned on its vertical axis and as each fin, being rotated with the boat, vertically aligns with the vane 43, the compass, if true, should indicate a 45° turning movement of the boat. As with the sunlight process, if the compass is inaccurate, it will indicate a turn of more or less than 45° between the respective alignment of the vane 43 with the fins and thus the degree of inaccuracy may be established in each 45° sector.

From the aforegoing description it may be seen that the device of the present invention is exceedingly simple and inexpensive, yet accurate and dependable. It may be used in bright sunlight for checking the compass or, if sunlight is not available, a usually existing breeze or wind of at least 1 to 2 miles per hour may be used instead. A reliable check on the accuracy of the compass may be made by this device in practically all kinds of weather, either bright or overcast and dull and the operation may be completed in a relatively short time.

While the embodiment of the present invention as herein disclosed, constitutes a preferred form, it is to be understood that other forms might be adopted, all coming within the scope of the claims which follow.

What is claimed is as follows:

1. In a compass checking device, the combination with a base provided with means for removably attaching said base to an immovable member adjacent the compass to be checked; of a dial rotatably mounted upon the base; means interposed between the plate and dial, said means engaging both plate and dial and being operative frictionally to resist rotation of the dial; a plurality of fins extending at right angles from the surface of the dial opposite the base, said fins being radially spaced at 45 degrees one from the other.

2. In a compass checking device, the combination with a base having a central aperture; suction cups secured to one side of the base for attaching the base to an immovable object adjacent the compass being checked; a centrally apertured dial; a pin extending through the apertures of the base and dial said pin having an enlarged head engaging the dial, and rotatably securing the dial on the base; a spacer collar between the base and dial; resilient means interposed between the pin and base, urging the head of the pin upon the dial for frictionally resisting rotation of said dial relatively to the base; and a plurality of radially arranged fins extending at right angles from the side of the dial opposite the base, and being equally angularly spaced one relatively to the other.

3. In a compass checking device, the combination with a stationary base; of a dial rotatably mounted upon said base; frictional means interposed between the dial and base, said means being operative yieldably to resist rotation of the dial; a plurality of radially arranged fins extending at right angles from the side of the dial opposite the base, said fins being equally, angularly spaced; a vertical post attachable to the dial axially thereof and rotatable relatively thereto; and a weather-cock in the form of a vane extending radially from the post.

4. A device as defined by claim 2 in which, however, the pin has an axial recess in its headed end; a post rotatably fitting into said recess; and a weather vane extending radially from the post and over the respective disc-vanes.

5. A device for checking a compass secured in a boat, comprising in combination, a base having means for attaching it to an immovable part of the boat adjacent the compass; a dial carried by the base and having a plurality of fins secured thereto and equiangularly spaced one relatively to the other, each fin being so shaped as to successively cast a comparatively narrow and sharp line shadow on the dial when brought into a predetermined position relatively to the sun as the boat is turned completely around on its vertical axis; and a rotatable weather-vane axially supported on the dial and movable successively into vertical alignment with the said members on the dial, by a prevailing wind as the boat is turned completely around on said axis.

6. In a compass checking device, the combination with a stationary base; an indicating dial mounted upon the base so as to be grasped and itself rotated in either direction relatively thereto; frictional means interposed between the base and dial, said means yieldably resisting rotation of the dial on the base and holding said dial in any rotatably adjusted position on said base; and a plurality of completely flat, wafer-like fins extending edgewise from the side of the dial opposite the base and adjacent the peripheral edge of the dial, each fin having its entire flat surfaces arranged diametrically of the dial, all fins being at right angles to the face of the dial and equally spaced one from the other.

OLAF RASMUSSEN.

REFERENCES CITED

The following references are of record in the file of this patent:

UNITED STATES PATENTS

| Number | Name | Date |
|---|---|---|
| 127,575 | Cook | June 4, 1872 |
| 629,757 | Christensen | July 25, 1899 |
| 725,399 | Bliss | Apr. 14, 1903 |
| 908,110 | Lihom | Dec. 29, 1908 |